(12) United States Patent
Nichols et al.

(10) Patent No.: US 9,677,650 B2
(45) Date of Patent: Jun. 13, 2017

(54) CONTINUOUSLY VARIABLE TRANSMISSION

(71) Applicant: Fallbrook Intellectual Property Company LLC, Cedar Park, TX (US)

(72) Inventors: Jon M. Nichols, Georgetown, TX (US); Christopher M. Vasiliotis, Austin, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 0 days.

(21) Appl. No.: 14/885,846

(22) Filed: Oct. 16, 2015

(65) Prior Publication Data

US 2016/0040763 A1  Feb. 11, 2016

Related U.S. Application Data

(63) Continuation of application No. PCT/US2014/034300, filed on Apr. 16, 2014.
(Continued)

(51) Int. Cl.
*B62M 6/55* (2010.01)
*F16H 15/52* (2006.01)
*B62M 6/60* (2010.01)

(52) U.S. Cl.
CPC ............ *F16H 15/52* (2013.01); *B62M 6/55* (2013.01); *B62M 6/60* (2013.01)

(58) Field of Classification Search
None
See application file for complete search history.

(56) References Cited

U.S. PATENT DOCUMENTS

| 4,963 A | 2/1847 | Armstrong et al. |
|---|---|---|
| 719,595 A | 2/1903 | Huss |

(Continued)

FOREIGN PATENT DOCUMENTS

| CH | 118064 | 12/1926 |
|---|---|---|
| CN | 1054340 | 9/1991 |

(Continued)

OTHER PUBLICATIONS

Goi et al. Development of Traction Drive IDG (T-IDG), Proceedings of International Congress Continuously Variable and Hybrid Transmissions, Sep. 2007, 6 pages.
(Continued)

*Primary Examiner* — Dirk Wright
(74) *Attorney, Agent, or Firm* — Knobbe Martens Olson & Bear LLP

(57) ABSTRACT

A continuously variable transmission (CVT) can be used in concert with an electric motor to facilitate power assistance to a rider in a bicycle. In some embodiments, the CVT and motor is mounted on the frame of the bicycle at a location forward of the rear wheel hub of the bicycle. In some embodiments, the CVT is mounted on and supported by members of the bicycle frame such that the CVT is coaxial with the crankshaft of the bicycle. The crankshaft is configured to drive elements of the CVT, which are configured to operationally drive the traction rings and the traction planets. In some embodiments, the motor is configured to drive elements of the CVT. In other embodiments, the motor is configured to drive the crankshaft. Inventive component and subassemblies for such a CVT are disclosed.

13 Claims, 8 Drawing Sheets

Related U.S. Application Data

(60) Provisional application No. 61/814,122, filed on Apr. 19, 2013.

(56) References Cited

U.S. PATENT DOCUMENTS

| | | |
|---|---|---|
| 1,121,210 A | 12/1914 | Techel |
| 1,175,677 A | 3/1916 | Barnes |
| 1,207,985 A | 12/1916 | Null et al. |
| 1,380,006 A | 5/1921 | Nielsen |
| 1,390,971 A | 9/1921 | Samain |
| 1,558,222 A | 10/1925 | Beetow |
| 1,629,902 A | 5/1927 | Arter et al. |
| 1,631,069 A | 5/1927 | Smith |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,131,158 A | 9/1938 | Almen et al. |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,230,398 A | 2/1941 | Benjafield |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,553,465 A * | 5/1951 | Monge .............. B62M 6/20 475/3 |
| 2,586,725 A | 2/1952 | Henry |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,868,038 A | 5/1955 | Billeter |
| 2,716,357 A | 8/1955 | Rennerfelt |
| 2,730,904 A | 1/1956 | Rennerfelt |
| 2,748,614 A | 6/1956 | Weisel |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,035,460 A | 5/1962 | Guichard |
| 3,048,056 A | 8/1962 | Wolfram |
| 3,051,020 A | 8/1962 | Hartupee |
| 3,071,194 A | 1/1963 | Geske |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,229,538 A | 1/1966 | Schlottler |
| 3,237,468 A | 3/1966 | Schlottler |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,374,009 A | 3/1968 | Jeunet |
| 3,407,687 A | 10/1968 | Hayashi |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,769,849 A | 11/1973 | Hagen |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,984,129 A | 10/1976 | Hege |
| 3,987,681 A | 10/1976 | Keithley et al. |
| 3,996,807 A | 12/1976 | Adams |
| 4,053,173 A | 10/1977 | Chase, Sr. |
| 4,086,026 A | 4/1978 | Tamanini |
| 4,098,146 A | 7/1978 | McLarty |
| 4,103,514 A | 8/1978 | Grosse-Entrup |
| 4,158,317 A * | 6/1979 | James ............... B62M 9/08 475/185 |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,493,677 A | 1/1985 | Ikenoya |
| 4,494,524 A | 1/1985 | Wagner |
| 4,496,051 A | 1/1985 | Ortner |
| 4,501,172 A | 2/1985 | Kraus |
| 4,526,255 A | 7/1985 | Hennessey et al. |
| 4,546,673 A | 10/1985 | Shigematsu et al. |
| 4,549,874 A | 10/1985 | Wen |
| 4,560,369 A | 12/1985 | Hattori |
| 4,567,781 A | 2/1986 | Russ |
| 4,569,670 A | 2/1986 | McIntosh |
| 4,574,649 A | 3/1986 | Seol |
| 4,585,429 A | 4/1986 | Marier |
| 4,617,838 A | 10/1986 | Anderson |
| 4,628,766 A | 12/1986 | De Brie Perry |
| 4,630,839 A | 12/1986 | Seol |
| 4,631,469 A | 12/1986 | Tsuboi et al. |
| 4,647,060 A | 3/1987 | Tomkinson |
| 4,651,082 A | 3/1987 | Kaneyuki |
| 4,663,990 A | 5/1987 | Itoh et al. |

(56) References Cited

U.S. PATENT DOCUMENTS

| | | |
|---|---|---|
| 4,700,581 A | 10/1987 | Tibbals, Jr. |
| 4,713,976 A | 12/1987 | Wilkes |
| 4,717,368 A | 1/1988 | Yamaguchi et al. |
| 4,725,258 A | 2/1988 | Joanis, Jr. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,806,066 A | 2/1989 | Rhodes et al. |
| 4,838,122 A | 6/1989 | Takamiya et al. |
| 4,856,374 A | 8/1989 | Kreuzer |
| 4,857,035 A | 8/1989 | Anderson |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,961,477 A | 10/1990 | Sweeney |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schievelbusch |
| 5,083,982 A | 1/1992 | Sato |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,323,570 A | 6/1994 | Kuhlman et al. |
| 5,330,396 A | 7/1994 | Lohr et al. |
| 5,355,749 A | 10/1994 | Obara et al. |
| 5,356,348 A | 10/1994 | Bellio et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,758 A | 9/1997 | Williamson |
| 5,669,845 A | 9/1997 | Muramoto et al. |
| 5,690,346 A | 11/1997 | Keskitalo |
| 5,701,786 A | 12/1997 | Kawakami |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,895,337 A | 4/1999 | Fellows et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 5,995,895 A | 11/1999 | Watt et al. |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,050,854 A | 4/2000 | Fang et al. |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,074,320 A | 6/2000 | Miyata et al. |
| 6,076,846 A | 6/2000 | Clardy |
| 6,079,726 A | 6/2000 | Busby |
| 6,083,139 A | 7/2000 | Deguchi |
| 6,086,506 A | 7/2000 | Petersmann et al. |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,155,132 A | 12/2000 | Yamane |
| 6,159,126 A | 12/2000 | Oshidari |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,201,315 B1 | 3/2001 | Larsson |
| 6,210,297 B1 | 4/2001 | Knight |
| 6,217,473 B1 | 4/2001 | Ueda et al. |
| 6,217,478 B1 | 4/2001 | Vohmann et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,293,575 B1 | 9/2001 | Burrows et al. |
| 6,296,593 B1 | 10/2001 | Gotou |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,340,067 B1 | 1/2002 | Fujiwara |
| 6,358,174 B1 | 3/2002 | Folsom et al. |
| 6,358,178 B1 | 3/2002 | Wittkopp |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,523,223 B2 | 2/2003 | Wang |
| 6,532,890 B2 | 3/2003 | Chen |
| 6,551,210 B2 | 4/2003 | Miller |
| 6,571,726 B2 | 6/2003 | Tsai et al. |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |

(56) References Cited

U.S. PATENT DOCUMENTS

| | | |
|---|---|---|
| 6,723,014 B2 | 4/2004 | Shinso et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,868,949 B2 | 3/2005 | Braford |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,000,496 B2 | 2/2006 | Wessel et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,195 B2 | 6/2006 | Berhan |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| D546,741 S | 7/2007 | Iteya et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| D548,655 S | 8/2007 | Barrow et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,383,748 B2 | 6/2008 | Rankin |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| D579,833 S | 11/2008 | Acenbrak |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,600,771 B2 | 10/2009 | Miller et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 * | 3/2011 | Miller ............... B62M 9/08 280/261 |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |

(56) References Cited

U.S. PATENT DOCUMENTS

| | | |
|---|---|---|
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,517,888 B1 | 8/2013 | Brookins |
| 8,535,199 B2 | 9/2013 | Lohr et al. |
| 8,550,949 B2 | 10/2013 | Miller |
| 8,585,528 B2 | 11/2013 | Carter et al. |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,678,974 B2 | 3/2014 | Lohr |
| 8,708,360 B2 | 4/2014 | Miller et al. |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,818,661 B2 | 8/2014 | Keilers et al. |
| 8,845,485 B2 | 9/2014 | Smithson et al. |
| 8,852,050 B2 | 10/2014 | Thomassy |
| 8,870,711 B2 | 10/2014 | Pohl et al. |
| 8,888,643 B2 | 11/2014 | Lohr et al. |
| 8,900,085 B2 | 12/2014 | Pohl et al. |
| 8,920,285 B2 | 12/2014 | Smithson et al. |
| 8,924,111 B2 | 12/2014 | Fuller |
| 8,996,263 B2 | 3/2015 | Quinn et al. |
| 9,017,207 B2 | 4/2015 | Pohl et al. |
| 9,022,889 B2 | 5/2015 | Miller |
| 9,046,158 B2 | 6/2015 | Miller et al. |
| 9,074,674 B2 | 7/2015 | Nichols et al. |
| 9,086,145 B2 | 7/2015 | Pohl et al. |
| 9,121,464 B2 | 9/2015 | Nichols et al. |
| 9,182,018 B2 | 11/2015 | Bazyn et al. |
| 9,328,807 B2 * | 5/2016 | Carter .................. F16H 9/04 |
| 2001/0008192 A1 | 7/2001 | Morisawa |
| 2001/0023217 A1 | 9/2001 | Miyagawa et al. |
| 2001/0041644 A1 | 11/2001 | Yasuoka et al. |
| 2001/0044358 A1 | 11/2001 | Taniguchi |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0049113 A1 | 4/2002 | Watanabe et al. |
| 2002/0117860 A1 | 8/2002 | Man et al. |
| 2002/0128107 A1 | 9/2002 | Wakayama |
| 2002/0153695 A1 | 10/2002 | Wang |
| 2002/0169051 A1 | 11/2002 | Oshidari |
| 2002/0189524 A1 | 12/2002 | Chen |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0096674 A1 | 5/2003 | Uno |
| 2003/0132051 A1 | 7/2003 | Nishii et al. |
| 2003/0135316 A1 | 7/2003 | Kawamura et al. |
| 2003/0160420 A1 | 8/2003 | Fukuda |
| 2003/0176247 A1 | 9/2003 | Gottschalk |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0237698 A1 | 12/2004 | Hilsky et al. |
| 2004/0254047 A1 | 12/2004 | Frank et al. |
| 2005/0037876 A1 | 2/2005 | Unno et al. |
| 2005/0085979 A1 | 4/2005 | Carlson et al. |
| 2005/0181905 A1 | 8/2005 | Ali et al. |
| 2005/0227809 A1 | 10/2005 | Bitzer et al. |
| 2006/0006008 A1 | 1/2006 | Brunemann et al. |
| 2006/0052204 A1 | 3/2006 | Eckert et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0041823 A1 | 2/2007 | Miller |
| 2007/0099753 A1 | 5/2007 | Matsui et al. |
| 2007/0149342 A1 | 6/2007 | Guenter et al. |
| 2007/0155552 A1 | 7/2007 | De Cloe |
| 2007/0155567 A1 | 7/2007 | Miller et al. |
| 2007/0193391 A1 | 8/2007 | Armstrong et al. |
| 2007/0228687 A1 | 10/2007 | Parker |
| 2008/0009389 A1 | 1/2008 | Jacobs |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0070729 A1 | 3/2008 | Miller et al. |
| 2008/0073137 A1 | 3/2008 | Miller et al. |
| 2008/0073467 A1 | 3/2008 | Miller et al. |
| 2008/0079236 A1 | 4/2008 | Miller et al. |
| 2008/0081715 A1 | 4/2008 | Miller et al. |
| 2008/0081728 A1 | 4/2008 | Faulring et al. |
| 2008/0085795 A1 | 4/2008 | Miller et al. |
| 2008/0085796 A1 | 4/2008 | Miller et al. |
| 2008/0085797 A1 | 4/2008 | Miller et al. |
| 2008/0085798 A1 | 4/2008 | Miller et al. |
| 2008/0139363 A1 | 6/2008 | Williams |
| 2008/0149407 A1 | 6/2008 | Shibata et al. |
| 2008/0183358 A1 | 7/2008 | Thomson et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0093479 A1 | 4/2010 | Carter et al. |
| 2010/0145573 A1 | 6/2010 | Vasilescu |
| 2011/0127096 A1 | 6/2011 | Schneidewind |
| 2011/0230297 A1 | 9/2011 | Shiina et al. |
| 2011/0291507 A1 | 12/2011 | Post |
| 2011/0319222 A1 | 12/2011 | Ogawa et al. |
| 2012/0035015 A1 | 2/2012 | Ogawa et al. |

(56) References Cited

U.S. PATENT DOCUMENTS

| | | |
|---|---|---|
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0190123 A1 | 7/2013 | Pohl et al. |
| 2013/0288848 A1 | 10/2013 | Carter et al. |
| 2013/0337971 A1 | 12/2013 | Kostrup |
| 2014/0073470 A1 | 3/2014 | Carter et al. |
| 2014/0121922 A1 | 5/2014 | Vasiliotis et al. |
| 2014/0148303 A1 | 5/2014 | Nichols et al. |
| 2014/0179479 A1 | 6/2014 | Nichols et al. |
| 2014/0206499 A1 | 7/2014 | Lohr |
| 2014/0248988 A1 | 9/2014 | Lohr et al. |
| 2014/0257650 A1 | 9/2014 | Carter et al. |
| 2014/0274536 A1 | 9/2014 | Versteyhe |
| 2014/0323260 A1 | 10/2014 | Miller et al. |
| 2014/0329637 A1 | 11/2014 | Thomassy et al. |
| 2014/0335991 A1 | 11/2014 | Lohr et al. |
| 2014/0365059 A1 | 12/2014 | Keilers et al. |
| 2015/0018154 A1 | 1/2015 | Thomassy |
| 2015/0039195 A1 | 2/2015 | Pohl et al. |
| 2015/0051801 A1 | 2/2015 | Quinn et al. |
| 2015/0072827 A1 | 3/2015 | Lohr et al. |
| 2015/0080165 A1 | 3/2015 | Pohl et al. |
| 2015/0226323 A1 | 8/2015 | Pohl et al. |
| 2015/0233473 A1 | 8/2015 | Miller et al. |
| 2015/0260284 A1 | 9/2015 | Miller et al. |
| 2015/0337928 A1 | 11/2015 | Smithson |
| 2015/0345599 A1 | 12/2015 | Ogawa |
| 2015/0369348 A1 | 12/2015 | Nichols et al. |
| 2015/0377305 A1 | 12/2015 | Nichols et al. |
| 2016/0003349 A1 | 1/2016 | Kimura et al. |
| 2016/0061301 A1 | 3/2016 | Bazyn et al. |
| 2016/0146342 A1 | 5/2016 | Vasiliotis et al. |
| 2016/0178037 A1 | 6/2016 | Pohl |
| 2016/0186847 A1 | 6/2016 | Nichols et al. |
| 2016/0201772 A1 | 7/2016 | Lohr et al. |
| 2016/0244063 A1 | 8/2016 | Carter et al. |
| 2016/0273627 A1 | 9/2016 | Miller et al. |
| 2016/0298740 A1 | 10/2016 | Carter et al. |

FOREIGN PATENT DOCUMENTS

| | | | |
|---|---|---|---|
| CN | 2245830 | 1/1997 | |
| CN | 1157379 | 8/1997 | |
| CN | 1167221 | 12/1997 | |
| CN | 1204991 | 1/1999 | |
| CN | 1283258 | 2/2001 | |
| CN | 1300355 | 6/2001 | |
| CN | 1412033 | 4/2003 | |
| CN | 1434229 | 8/2003 | |
| CN | 1474917 | 2/2004 | |
| CN | 1483235 | 3/2004 | |
| CN | 1568407 | 1/2005 | |
| CN | 1654858 | 8/2005 | |
| CN | 2714896 | 8/2005 | |
| CN | 1736791 | 2/2006 | |
| CN | 1847702 | 10/2006 | |
| CN | 1860315 | 11/2006 | |
| CN | 1940348 | 4/2007 | |
| DE | 498 701 | 5/1930 | |
| DE | 1171692 | 6/1964 | |
| DE | 2 310880 | 9/1974 | |
| DE | 2 136 243 | 1/1975 | |
| DE | 2436496 | 2/1975 | |
| DE | 263566 | 1/1989 | |
| DE | 39 40 919 A1 | 6/1991 | |
| DE | 19851738 | 5/2000 | |
| DE | 10155372 | 5/2003 | |
| DE | 102011016672 A1 * | 10/2012 | ............ B62M 11/16 |
| DE | 102012023551 A1 * | 6/2014 | ............ B62M 6/55 |
| DE | 102014007271 A1 * | 12/2014 | ............ B62M 11/12 |
| DE | WO 2016062461 A1 * | 4/2016 | ............ B62M 6/55 |
| EP | 0 432 742 | 12/1990 | |
| EP | 0 528 381 | 2/1993 | |
| EP | 0 528 382 | 2/1993 | |
| EP | 0 635 639 | 1/1995 | |
| EP | 0 638 741 | 2/1995 | |
| EP | 0 831 249 | 3/1998 | |
| EP | 0 832 816 | 4/1998 | |
| EP | 0 976 956 | 2/2000 | |
| EP | 1 136 724 | 9/2001 | |
| EP | 1 251 294 | 10/2002 | |
| EP | 1 366 978 | 3/2003 | |
| EP | 1 362 783 | 11/2003 | |
| EP | 1 433 641 | 6/2004 | |
| EP | 1 452 441 | 9/2004 | |
| EP | 1 518 785 | 3/2005 | |
| EP | 1 624 230 | 2/2006 | |
| EP | 2 893 219 | 7/2015 | |
| FR | 620375 | 4/1927 | |
| FR | 2460427 | 1/1981 | |
| FR | 2590638 | 5/1987 | |
| GB | 14132 | 5/1910 | |
| GB | 391448 | 4/1933 | |
| GB | 592320 | 9/1947 | |
| GB | 906002 | 9/1962 | |
| GB | 919430 | 2/1963 | |
| GB | 1132473 | 11/1968 | |
| GB | 1165545 | 10/1969 | |
| GB | 1376057 | 12/1974 | |
| GB | 2031822 | 4/1980 | |
| GB | 2035482 | 6/1980 | |
| GB | 2080452 | 8/1982 | |
| JP | 38-025315 | 11/1963 | |
| JP | 41-3126 | 2/1966 | |
| JP | 42-2843 | 2/1967 | |
| JP | 42-2844 | 2/1967 | |
| JP | 44-1098 | 1/1969 | |
| JP | 47-000448 | 1/1972 | |
| JP | 47-207 | 6/1972 | |
| JP | 47-20535 | 6/1972 | |
| JP | 47-00962 | 11/1972 | |
| JP | 47-29762 | 11/1972 | |
| JP | 48-54371 | 7/1973 | |
| JP | 49-12742 | 3/1974 | |
| JP | 49-012742 | 3/1974 | |
| JP | 49-013823 | 4/1974 | |
| JP | 49-041536 | 11/1974 | |
| JP | 50-114581 | 9/1975 | |
| JP | 51-25903 | 8/1976 | |
| JP | 51-150380 | 12/1976 | |
| JP | 52-35481 | 3/1977 | |
| JP | 53-048166 | 1/1978 | |
| JP | 55-135259 | 10/1980 | |
| JP | 56-047231 | 4/1981 | |
| JP | 56-101448 | 8/1981 | |
| JP | 56-127852 | 10/1981 | |
| JP | 58-065361 | 4/1983 | |
| JP | 59-069565 | 4/1984 | |
| JP | 59-144826 | 8/1984 | |
| JP | 59-190557 | 10/1984 | |
| JP | 60-247011 | 12/1985 | |
| JP | 61-031754 | 2/1986 | |
| JP | 61-053423 | 3/1986 | |
| JP | 61-144466 | 7/1986 | |
| JP | 61-173722 | 10/1986 | |
| JP | 61-270552 | 11/1986 | |
| JP | 62-075170 | 4/1987 | |
| JP | 63-219953 | 9/1988 | |
| JP | 63-160465 | 10/1988 | |
| JP | 01-039865 | 11/1989 | |
| JP | 01-286750 | 11/1989 | |
| JP | 01-308142 | 12/1989 | |
| JP | 02-130224 | 5/1990 | |
| JP | 02-157483 | 6/1990 | |
| JP | 02-271142 | 6/1990 | |
| JP | 02-182593 | 7/1990 | |
| JP | 03-149442 | 6/1991 | |
| JP | 03-223555 | 10/1991 | |
| JP | 04-166619 | 6/1992 | |
| JP | 04-272553 | 9/1992 | |
| JP | 04-327055 | 11/1992 | |
| JP | 04-351361 | 12/1992 | |
| JP | 05-087154 | 4/1993 | |

(56) References Cited

FOREIGN PATENT DOCUMENTS

| | | |
|---|---|---|
| JP | 06-050169 | 2/1994 |
| JP | 06-050358 | 2/1994 |
| JP | 07-42799 | 2/1995 |
| JP | 07-133857 | 5/1995 |
| JP | 07-139600 | 5/1995 |
| JP | 07-259950 | 10/1995 |
| JP | 08-170706 | 7/1996 |
| JP | 08-247245 | 9/1996 |
| JP | 08-270772 | 10/1996 |
| JP | 09-024743 | 1/1997 |
| JP | 09-089064 | 3/1997 |
| JP | 10-061739 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-511621 | 11/1998 |
| JP | 11-063130 | 3/1999 |
| JP | 11-091411 | 4/1999 |
| JP | 11-257479 | 9/1999 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2002-147558 | 5/2002 |
| JP | 2002-250421 | 6/2002 |
| JP | 2002-307956 | 10/2002 |
| JP | 2002-533626 | 10/2002 |
| JP | 2002-372114 | 12/2002 |
| JP | 2003-028257 | 1/2003 |
| JP | 2003-56662 | 2/2003 |
| JP | 2003-161357 | 6/2003 |
| JP | 2003 194206 | 7/2003 |
| JP | 2003-194207 | 7/2003 |
| JP | 2003-336732 | 11/2003 |
| JP | 2004-011834 | 1/2004 |
| JP | 2004-162652 | 6/2004 |
| JP | 2004-189222 | 7/2004 |
| JP | 2004-526917 | 9/2004 |
| JP | 2004-301251 | 10/2004 |
| JP | 2005-003063 | 1/2005 |
| JP | 2005-188694 | 7/2005 |
| JP | 2005-240928 | 9/2005 |
| JP | 2005-312121 | 11/2005 |
| JP | 2006-015025 | 1/2006 |
| JP | 2006-283900 | 10/2006 |
| JP | 2006-300241 | 11/2006 |
| JP | 2007-321931 | 12/2007 |
| JP | 2008-002687 | 1/2008 |
| JP | 2010-069005 | 4/2010 |
| KR | 10-2002-0071699 | 9/2002 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 510867 | 11/2002 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| WO | WO 99/08024 | 2/1999 |
| WO | WO 99/20918 | 4/1999 |
| WO | WO 01/73319 | 10/2001 |
| WO | WO 03/100294 | 12/2003 |
| WO | WO 2005/083305 | 9/2005 |
| WO | WO 2005/108825 | 11/2005 |
| WO | WO 2005/111472 | 11/2005 |
| WO | WO 2006/091503 | 8/2006 |
| WO | WO 2007/044128 | 4/2007 |
| WO | WO 2007/061993 | 5/2007 |
| WO | WO 2007/070167 | 6/2007 |
| WO | WO 2007/077502 | 7/2007 |
| WO | WO 2007/133538 | 11/2007 |
| WO | WO 2008/078047 | 7/2008 |
| WO | WO 2008/100792 | 8/2008 |
| WO | WO 2008/131353 | 10/2008 |
| WO | WO 2010/135407 | 11/2010 |
| WO | WO 2011/101991 | 8/2011 |
| WO | WO 2011/121743 | 10/2011 |
| WO | WO 2012/030213 | 3/2012 |
| WO | WO 2013/186732 | 11/2014 |

OTHER PUBLICATIONS

Pohl CVT Split Power Transmissions, A Configuration versus Performance Study with an Emphasis on the Hydromechanical Type, Society of Automotive Engineers, Mar. 4, 2002, 11 pages.
Pohl et al., Configuration Analysis of a Spherical Traction Drive CVT/IVT, SAE International, 2004 International Continuously Variable and Hybrid Transmission Congress, Sep. 23, 2004, 6 pages.
Smithson et al., Scalability for an Alternative Rolling Traction CVT, Society of Automotive Engineers, Mar. 8, 2004, 6 pages.
International Search Report and Written Opinion dated Aug. 5, 2014 in Int'l Application No. PCT/US14/034300.

* cited by examiner

CONTINUOUSLY VARIABLE TRANSMISSION

CROSS REFERENCE TO RELATED APPLICATIONS

This application is a continuation of International Application No. PCT/US2014/034300, filed Apr. 16, 2014, which claims the benefit of U.S. Provisional Patent Application No. 61/814,122, filed Apr. 19, 2013. The disclosures of all of the above-referenced prior applications, publications, and patents are considered part of the disclosure of this application, and are incorporated by reference herein in their entirety.

BACKGROUND OF THE INVENTION

Field of the Invention

This disclosure relates generally to transmissions, and more particularly to continuously variable transmissions (CVTs). Even more particularly, embodiments disclosed herein relate to CVTs useful in any machine, device, vehicle, etc., where it is desired to adjust the ratio of input speed to output speed, and to methods for controlling CVTs, including automatically controlling CVTs.

Description of the Related Art

The drivetrain of a bicycle typically consists of pedals coupled to cranks for driving a crankshaft, which is received in, and supported by, frame members of the bicycle typically referred to as the "bottom bracket." The crankshaft is coupled to a sprocket that transfers power to the rear wheel of the bicycle by a chain. A cog at the rear wheel receives power from the chain and is adapted to interface with the rear wheel hub for driving the rear wheel of the bicycle. Some bicycles are provided with internally geared rear hubs, where a set of gears is arranged to receive power from the cog and drive the rear wheel. In some applications, a bicycle is provided with a CVT at the rear hub to drive the rear wheel. The embodiments of the CVTs disclosed here address needs in the field of continuously variable transmissions.

Furthermore, automatic transmissions are found in a variety of machines. However, in certain fields manual operation of the transmission is still prevalent. For example, in the bicycle industry, most bicycles are configured for manual operation of the transmission, which generally involves manually actuating levers, cables, and linkages to cause a chain to move from one rear sprocket to another. However, an ongoing need has been manifested for systems and corresponding methods to facilitate the automatic control of the transmission of a bicycle. Inventive embodiments disclosed here address this need, among others, by providing systems for, and methods of, automatically controlling transmissions, which systems and methods in some cases are particularly suitable for human powered vehicles such as bicycles.

An electric motor producing variable speed and constant power is highly desired in some vehicle and industrial uses. In such constant power applications, torque and speed vary inversely. For example, torque increases as speed decreases or torque decreases as speed increases. Some electric motors can provide constant power above their rated power; for example, a 1750 rpm AC motor can provide constant power when speed increases above 1750 rpm because torque can be designed to decrease proportionally with the speed increase. However, a motor by itself cannot produce constant power when operating at a speed below its rated power. Frequently torque remains constant or even decreases as the motor speed decreases. Controllers can be used to increase current, and torque, into the electric motor at low speeds, but an increase in the wire diameter of the windings is required to accommodate the additional current to avoid overheating. This is undesirable because the motor becomes larger and more expensive than necessary for typical operating conditions. The electronic controller also increases expense and complexity. Another method to achieve sufficient low speed torque is to use a bigger motor. However, this increases cost, size, weight, and makes the motor more difficult to package with the machine it powers. Thus, there exists a need for an improved method to provide variable speed and constant power with an electric motor. The continuously variable transmission can be integrated with an electric motor for some advantageous applications.

SUMMARY OF THE INVENTION

The systems and methods described herein have several features, no single one of which is solely responsible for the overall desirable attributes. Without limiting the scope as expressed by the claims that follow, the more prominent features will now be discussed briefly. After considering this discussion, and particularly after reading the section entitled "Detailed Description of Certain Embodiments," one will understand how the features of the systems and methods provide several advantages over related traditional systems and methods.

One aspect of the disclosure relates to a bicycle having a number of bicycle frame members and a crankshaft operationally coupled to one or more cranks. In some embodiments, the crankshaft substantially defines a crank axis. The bicycle can have a continuously variable transmission (CVT) coupled to the crankshaft. The CVT has a group of traction planets arranged angularly about a longitudinal axis of the CVT. Each traction planet is adapted to rotate about a tiltable axis. The CVT also has a first carrier member with a number of radially offset slots formed in the first carrier member and arranged angularly about the longitudinal axis. The CVT is provided with a second carrier member having a number of radial slots formed in the second carrier member and arranged angularly about the longitudinal axis. In some embodiments, the slots in the second carrier member may also be radially offset. The second carrier member can be coupled to the first carrier member. The first and second carrier members are operably coupled to each traction planet. The first carrier member is configured to rotate angularly relative to the second carrier member about the longitudinal axis. The CVT can also have a traction ring in contact with each traction planet. In some embodiments, the traction ring is located radially outward of each traction planet. The CVT has first and second sun members in contact with each traction planet. In some embodiments, the first and second sun members are located radially inward of the traction ring. The bicycle can have an electric motor operably coupled to the CVT.

Another aspect of the disclosure is addressed to a continuously variable transmission (CVT) having a group of traction planets arranged about a main drive axis. The CVT has a traction ring in contact with each traction planet. In some embodiments, the traction ring is located radially outward of each traction planet. The CVT has first and second sun members in contact with each traction planet. In some embodiments, the first and second sun members are located radially inward of the traction ring. The first sun member and the traction ring are adapted to receive a rotational power. The CVT also has a carrier assembly having first and second carrier plates. The first carrier plate is a substantially disc shaped body having a center arranged coaxially with the main drive axis. In some embodiments, the first carrier plate has a number of radially offset slots arranged angularly about the center. Each of the radially offset slots is parallel with, and has a linear offset from, a radial centerline of the disc shaped body. The centerline of the disc shaped body is perpendicular to the main drive axis thereby forming a coordinate system. The coordinate system has a z-axis corresponding to the main drive axis, a y-axis corresponding to the radial centerline, and an x-axis perpendicular to the y-axis and z-axis. The radially offset slots lie in a plane formed by the x-axis and y-axis. Each traction planet is adapted to tilt in a plane formed by the y-axis and z-axis.

Yet another aspect of the disclosure concerns a continuously variable transmission having a housing coupled to a bottom bracket of a bicycle. In some embodiments, the transmission has a group of spherical traction planets arranged angularly about a longitudinal axis. The transmission can have a traction ring in contact with each traction planet. The traction ring is located radially outward of each traction planet. In some embodiments, the transmission has first and second sun members in contact with each traction planet. The first and second sun members are located radially inward of the traction ring. The first sun member and the traction ring are adapted to receive a rotational power. The transmission also has a carrier assembly provided with a first generally disc-shaped body having a first center and a second generally disc-shaped body having a second center arranged coaxially with respect to the first center thereby forming a main axis. The first generally disc-shaped body can have a number of radially offset slots formed on and arranged angularly about the center of the first disc-shaped body. Each of the radially offset slots has a linear offset from a centerline of the first disc shaped body. The centerline of the first disc shaped body is perpendicular to the main axis thereby forming a coordinate system, the coordinate system having a z-axis corresponding to the main axis, a y-axis corresponding to the radial centerline, and an x-axis perpendicular to the y-axis and z-axis. The radially offset slots lie in a plane formed by the x-axis and y-axis. In some embodiments, the "radially offset slots" are slots that are formed in the carrier member parallel with a radius of the carrier member but are formed some distance offset from the radius so that their respective axes do not intersect with the radial center of the carrier. The transmission can include an electric motor coupled to the traction ring. The electric motor is coaxial about the longitudinal axis. The electric motor is located within the interior of the housing.

Still another aspect of the disclosure is directed to an electric drivetrain for a bicycle having a continuously variable transmission (CVT) with a longitudinal axis. In some embodiments, the CVT has a group of traction planets adapted to rotate about a tiltable axis. The CVT can have a traction ring in contact with each traction planet. In some embodiments, the traction ring is located radially outward of each traction planet. The CVT is provided with first and second sun members in contact with each traction planet. The first and second sun members are located radially inward of the traction ring. The CVT is provided with first and second axial force generators coupled to the first and second sun members, respectively. In some embodiments, the CVT includes a first carrier member having a number of radially offset slots formed in the first carrier member and arranged angularly about the longitudinal axis. The CVT has a second carrier member having a number of radial slots formed in the second carrier member and arranged angularly about the longitudinal axis. The second carrier member is coupled to the first carrier member. The first and second carrier members are operably coupled to each traction planet. The first carrier member is configured to rotate relative to the second carrier member about the longitudinal axis. The drivetrain also includes a shifter operably coupled to the CVT. In some embodiments, the shifter is adapted to apply a skew condition to the CVT to tilt the axes of the traction planets. The drivetrain has an electric motor operably coupled to the traction ring.

In one aspect the disclosure addresses a method of automatically controlling a ball-planetary transmission of a bicycle. The method involves receiving an input associated with a target user pedaling speed, determining a speed of the bicycle, and determining a target transmission ratio based at least in part on the target user pedaling speed and the determined speed of the bicycle. The method can also include adjusting a transmission ratio of the transmission to be substantially equal to the target transmission ratio. In some embodiments, the method further includes the step of determining an encoder position associated with the target user pedaling speed. In some embodiments, adjusting a transmission ratio includes commanding an actuator to move to the determined encoder position. In some embodiments, adjusting a shift drum includes the step of rotating a shift rod about a longitudinal axis of the transmission.

In another aspect, the disclosure is directed to a method of automatically controlling a ball-planetary transmission of a bicycle. The method includes receiving an input associated with a target user pedaling speed, determining a speed of the bicycle, and based upon the target user pedaling speed and the determined speed of the bicycle, adjusting a speed ratio of the bicycle to maintain a user pedaling speed within a band of the target user pedaling speed. In some embodiments, the band is the target user pedaling speed plus or minus 10 revolutions-per-minute (rpm). In other embodiments, the band is the target user pedal speed in the range of +/−2 rpm to about +/−5 rpm. In some embodiments, adjusting a speed ratio of the bicycle includes the step of determining an encoder position associated with the target user pedaling speed and the determined speed of the bicycle. In some embodiments, adjusting a speed ratio of the bicycle includes the step of commanding an actuator to move to the determined encoder position. In other embodiments, adjusting a speed ratio of the bicycle includes the step of adjusting a shift rod of the transmission. In some embodiments, adjusting the shift rod includes the step of rotating the shift rod about a longitudinal axis of the transmission.

Yet another aspect of the disclosure relates to a method of automatically controlling a ball-planetary transmission of a bicycle. The method involves providing an input associated with a target user pedaling speed, determining a speed of the bicycle, and identifying a target encoder position associated with the speed of the bicycle. The method can further include actuating a servo to achieve the target encoder position. In some embodiments, actuating a servo includes the step of adjusting a shift rod of the transmission. In some embodiments, identifying the target encoder position includes generating a data structure. In other embodiments, generating a data structure includes the step of recording an encoder position. In some embodiments, generating a data structure includes the steps of recording an input speed and recording an output speed. In some embodiments, the method includes the step of determining a speed ratio based at least in part on the input speed and the output speed. In other embodiments, the method includes the step of recording the speed ratio.

In one instance, the disclosure is concerned with a system for automatically shifting a ball-planetary bicycle transmission. The system includes a speed sensor configured to detect a speed of the bicycle, a processor configured to receive input from the speed sensor, and a data input interface configured to provide cadence data to the processor, the cadence data indicative of an input pedaling speed. The system can additionally have a memory in communication with the processor, the memory having stored therein one or more maps correlating bicycle speeds with speed ratios. In some embodiments, the system includes a logic module in communication with the processor, the logic module configured to cooperate with the processor to determine from the maps a target speed ratio based on a bicycle speed and an input pedaling speed. In some embodiments, the system has an actuator, in communication with the processor, the actuator configured to adjust a speed ratio of the transmission to be substantially equal to the determined target speed ratio. In some embodiments, the control unit includes at least one of a processor, an application specific integrated circuit, or a programmable logic array. The actuator is operably coupled to a shift rod of the transmission, the shift rod configured to adjust the speed ratio of the transmission. The data input interface can include a display and at least one button. The system can include a position sensor configured to provide an indication of a position of the actuator. The data structures can include a speed ratio data structure and a bicycle speed data structure. The system can have a power source configured to supply a power to the actuator. In some embodiments, the power source is a dynamo. In some embodiments, the actuator is operably coupled to a shift rod of the transmission.

Another aspect of the disclosure addresses a bicycle having a ball-planetary transmission and a system for automatically shifting the ball-planetary transmission. In some embodiments, the system has a speed sensor configured to detect a speed of the bicycle. The system has a processor configured to receive input from the speed sensor. In some embodiments, the system includes a data input interface configured to provide cadence data to the processor. The cadence data is indicative of an input pedaling speed. The system can include a memory in communication with the processor. In some embodiments, the memory has stored therein one or more maps correlating bicycle speeds with speed ratios. The system includes a logic module in communication with the processor. The logic module is configured to cooperate with the processor to determine from the maps a target speed ratio based on a bicycle speed and an input pedaling speed. The system can also include an actuator in communication with the processor. The actuator is configured to adjust a speed ratio of the transmission to be substantially equal to the determined target speed ratio. In some embodiments, the data input interface includes a display and at least one button. In some embodiments, the data input interface is mounted on a handlebar of the bicycle. The bicycle can include a position sensor configured to provide an indication of a position of the actuator. In some embodiments, the data structures have a speed ratio data structure and a bicycle speed data structure. In other embodiments, the ball-planetary transmission includes a shift rod, the shift rod operably coupled to the actuator.

In another aspect, embodiments of control mechanisms for CVTs are disclosed that are configured to rotate the net position of the two carrier members during a control movement. The sun may be an idler and the traction rings may provide power through contact patches with the traction planets, or vice versa. The sun member and the traction ring may be adapted to receive a rotational power. The carrier assembly may include a first carrier member having a first center, a second carrier member having a second center arranged coaxially with respect to the first center thereby forming a main axis, and a plurality of radially offset slots formed on and arranged angularly about the center of the first carrier member, each of the radially offset slots having a linear offset from a centerline of the first carrier member, as described with other embodiments above and herein. In some embodiments, the control mechanism is configured to rotate each of the first carrier member and the second carrier member about the main axis at a different rate. In some embodiments, the control mechanism comprises a rotatable gear structure having a first gear for engagement with the first carrier member and a second gear for engagement with the second carrier member. In some embodiments, the control mechanism is configured to rotate each of the first carrier member and the second carrier member about the main axis at a variable rate. In some embodiments, the control mechanism comprises a double cam structure having a first cam surface for contact with the first carrier member and a second cam surface for engagement with the second carrier member. In some embodiments, the first cam surface has a first magnitude and a first axis of eccentricity and the second cam surface has a second magnitude and a second axis of eccentricity, wherein the variable rate is determined based on the first magnitude, the second magnitude, the first axis of eccentricity and the second axis of eccentricity. In some embodiments, the first axis of eccentricity is angularly offset from the second axis of eccentricity. In some embodiments, wherein one or more of the first axis of eccentricity and the second axis of eccentricity is angularly offset from a zero plane associated with the longitudinal axis.

DETAILED DESCRIPTION OF CERTAIN EMBODIMENTS

Figure 1:
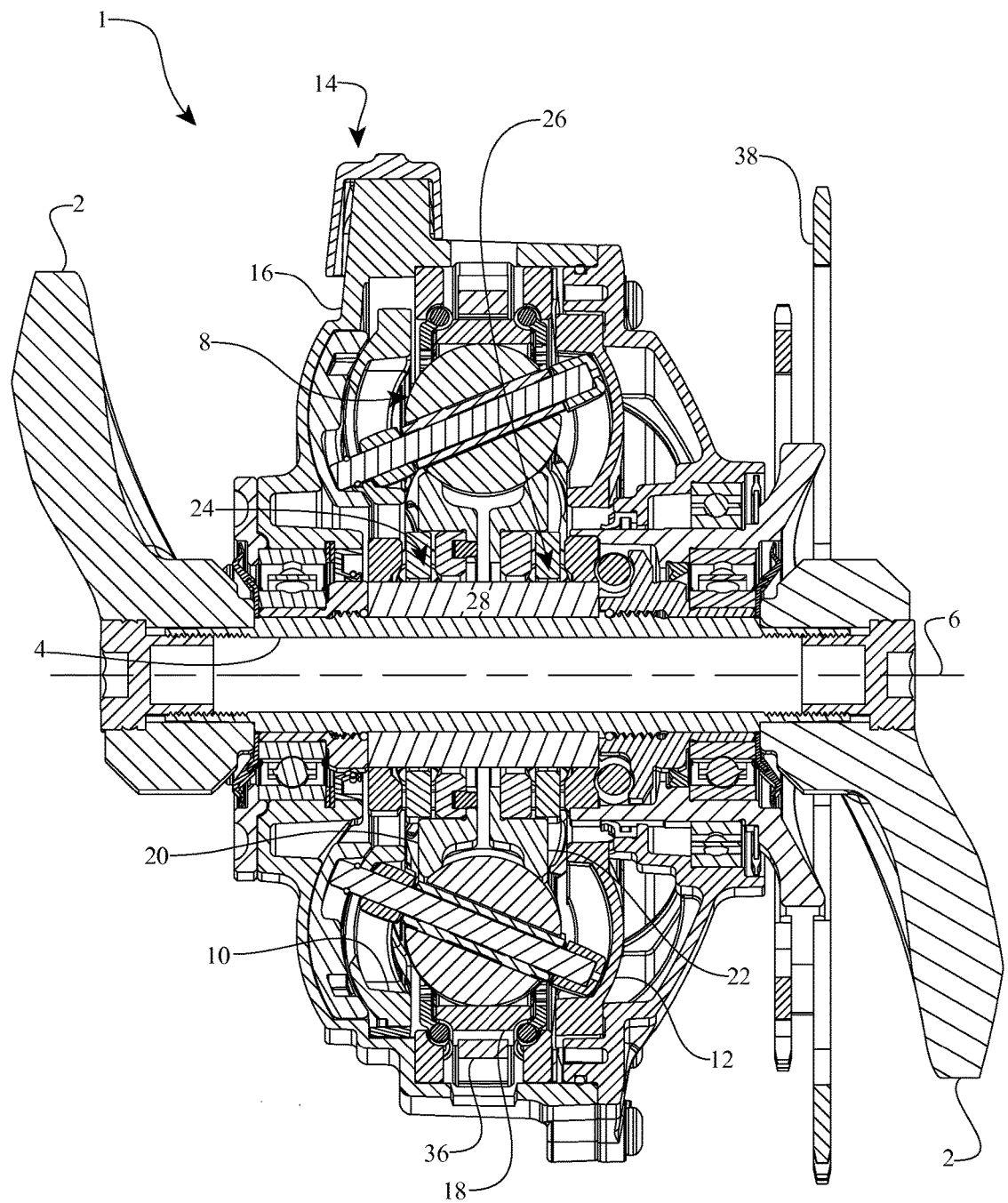
FIG. 1 is cross sectional view of a CVT adapted to couple to cranks of a bicycle.

Certain embodiments will be described now with reference to the accompanying figures, wherein like numerals refer to like elements throughout. The terminology used in the descriptions below is not to be interpreted in any limited or restrictive manner simply because it is used in conjunction with detailed descriptions of certain specific embodiments of the disclosure. Furthermore, embodiments disclosed herein can include several novel features, no single one of which is solely responsible for its desirable attributes or which is essential to practicing the embodiments described. Certain CVT and infinitely variable transmission (IVT) embodiments described here are generally related to the type disclosed in U.S. Pat. Nos. 6,241,636; 6,419,608; 6,689,012; 7,011,600; 7,166,052; 7,632,203; 7,914,029; 8,321,097; 8,376,903; 8,360,917; 8,393,989; U.S. patent application Ser. Nos. 11/243,484; 11/543,311; 12/198,402; 12/251,325; and Patent Cooperation Treaty Patent Application Nos. PCT/US2007/023315; PCT/IB2006/054911; PCT/US2008/068929; and PCT/US2008/074496. The entire disclosure of each of these patents and patent applications is hereby incorporated by reference herein.

As used here, the terms "operationally connected," "operationally coupled," "operationally linked," "operably connected," "operably coupled," "operably linked," and like terms, refer to a relationship (mechanical, linkage, coupling, etc.) between elements whereby operation of one element results in a corresponding, following, or simultaneous operation or actuation of a second element. It is noted that in using these terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "radial" is used here to indicate a direction or position that is perpendicular relative to a longitudinal axis of a transmission or variator and extends radially outward from a center point when describing a disc. The term "axial" as used here refers to a direction or position along an axis that is parallel to a main or longitudinal axis of a transmission or variator. For clarity and conciseness, at times similar components are labeled similarly.

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient ($\mu$) represents the maximum available traction forces which would be available at the interfaces of the contacting components and is a measure of the maximum available drive torque. Typically, friction drives generally relate to transferring power between two elements by frictional forces between the elements. For the purposes of this disclosure, it should be understood that the CVTs and IVTs described herein may operate in both tractive and frictional applications. For example, in the embodiment where an IVT is used for a bicycle application, the IVT can operate at times as a friction drive and at other times as a traction drive, depending on the torque and speed conditions present during operation.

Embodiments of the disclosure can be related to the control of a variator using generally spherical planets each having a tiltable axis of rotation (sometimes referred to here as a "planet axis of rotation") that can be adjusted to achieve a desired ratio of input speed to output speed during operation. In some embodiments, adjustment of the axis of rotation involves angular misalignment of the planet axis in a first plane in order to achieve an angular adjustment of the planet axis of rotation in a second plane, thereby adjusting the speed ratio of the variator. The angular misalignment in the first plane is referred to here as "skew" or "skew angle." This type of variator control is generally described in U.S. patent application Ser. Nos. 12/198,402 and 12/251,325. The entire disclosure of each of these patent applications is hereby incorporated by reference herein. In some embodiments, a control system coordinates the use of a skew angle to generate forces between certain contacting components in the variator that will tilt the planet axis of rotation in the second plane. The tilting of the planet axis of rotation adjusts the speed ratio of the variator. It should be noted that the embodiments disclosed herein may be implemented using other known methods for shifting a variator. Some embodiments build upon the improvements disclosed in U.S. Pat. No. 7,914,029, the entire disclosure of which is incorporated herein by reference.

Embodiments of a CVT, and components and control methods thereof, will be described now with reference to FIGS. 1-15. FIG. 1 shows a CVT 1 that can be used in many applications including, but not limited to, automobiles, light electrical vehicles, hybrid human-, electric-, or internal combustion powered vehicles, industrial equipment, wind turbines, etc. Any technical application that requires modulation of mechanical power transfer between a power input and a power sink (for example, a load) can implement embodiments of the CVT 1 in its power train.

Referring to FIG. 1, in some embodiments a CVT 1 can be operably coupled to a set of bicycle cranks 2. The bicycle cranks 2 are coupled to a crankshaft 4 configured to rotate about a crank axis 6. The CVT 1 is provided with a number of spherical traction planet assemblies 8, including traction planets, arranged angularly about a longitudinal axis. In this embodiment, the longitudinal axis of the CVT 1 is coaxial with the crank axis 6. In other embodiments, the longitudinal axis of the CVT 1 can be radially offset from the crank axis 6. Each traction planet assembly 8 is supported by first and second carrier members 10, 12, respectively. In some implementations, the second carrier member 12 is operably coupled to the first carrier member 10, and the first and second carrier members 10, 12 are coupled to each traction planet. The second carrier member 12 can include a plurality of radial slots formed in the second carrier member 12 and arranged angularly about the longitudinal axis of the CVT 1. In some embodiments, the first carrier member 10 is operably coupled to a control mechanism, which may include shifter 14. The shifter 14 is located radially outward of the traction planet assemblies 8 and is operably coupled to a transmission housing 16. In some embodiments, the CVT 1 is provided with a traction ring 18 in contact with, and radially outward of each traction planet assembly 8. Each traction planet assembly 8 is in contact with first and second sun members 20, 22, respectively. The first and second sun members 20, 22 are located radially inward of the traction ring 18. The first sun member 20 is operably coupled to a first axial force generator 24. In some embodiments, the first axial force generator 24 includes a set of rollers on cam ramps that are adapted to provide axial force dependent upon torque and/or speed during operation of the CVT 1. The second sun member 22 can be operably coupled to a second axial force generator 26. In some embodiments, a torque sensor 28 is coupled to the crankshaft 4 and the first axial force generator 24.

Figure 2:
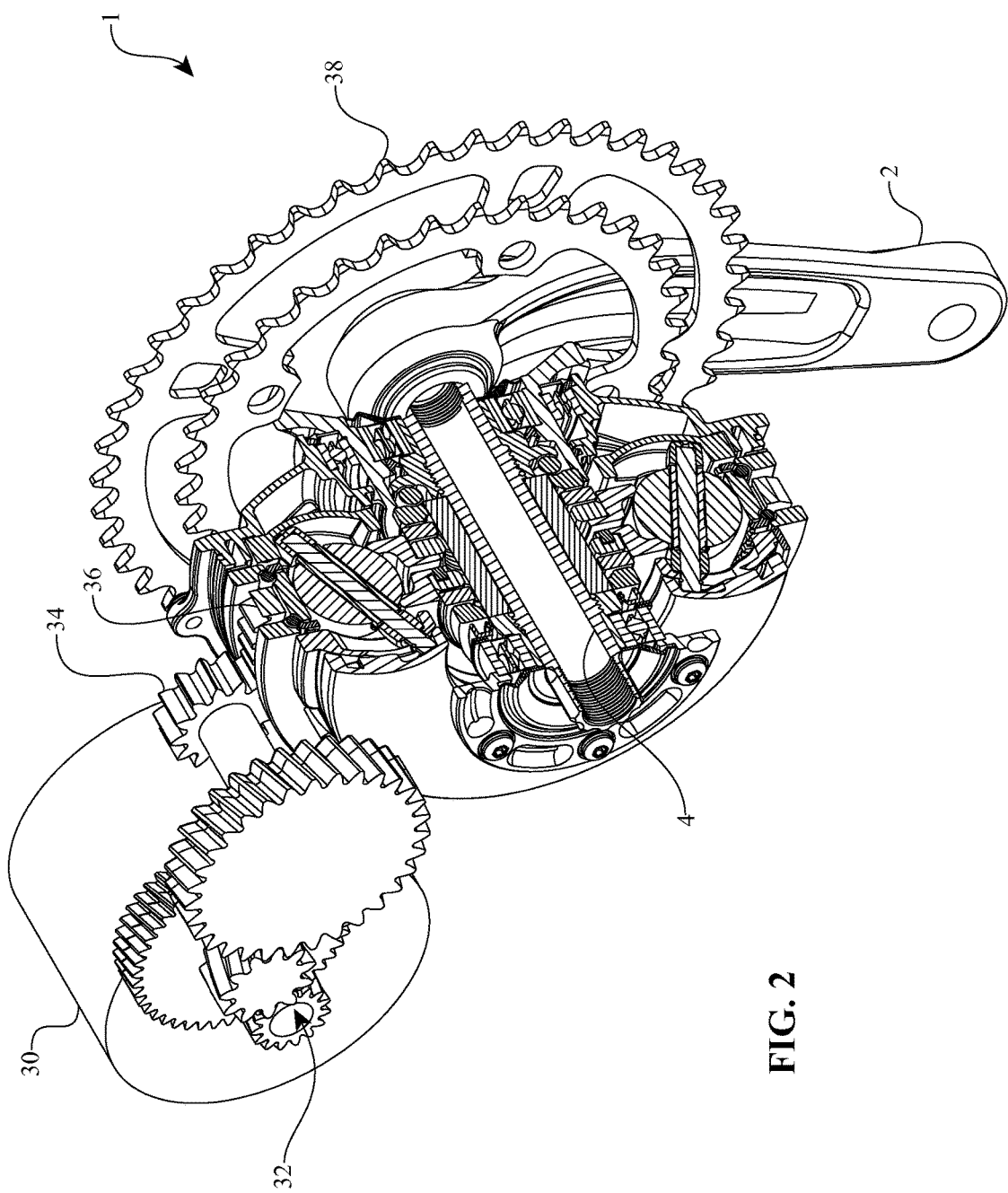
FIG. 2 is a partial cross-sectional perspective view of the CVT of FIG. 1 coupled to an electric drive motor assembly.
Figure 3:
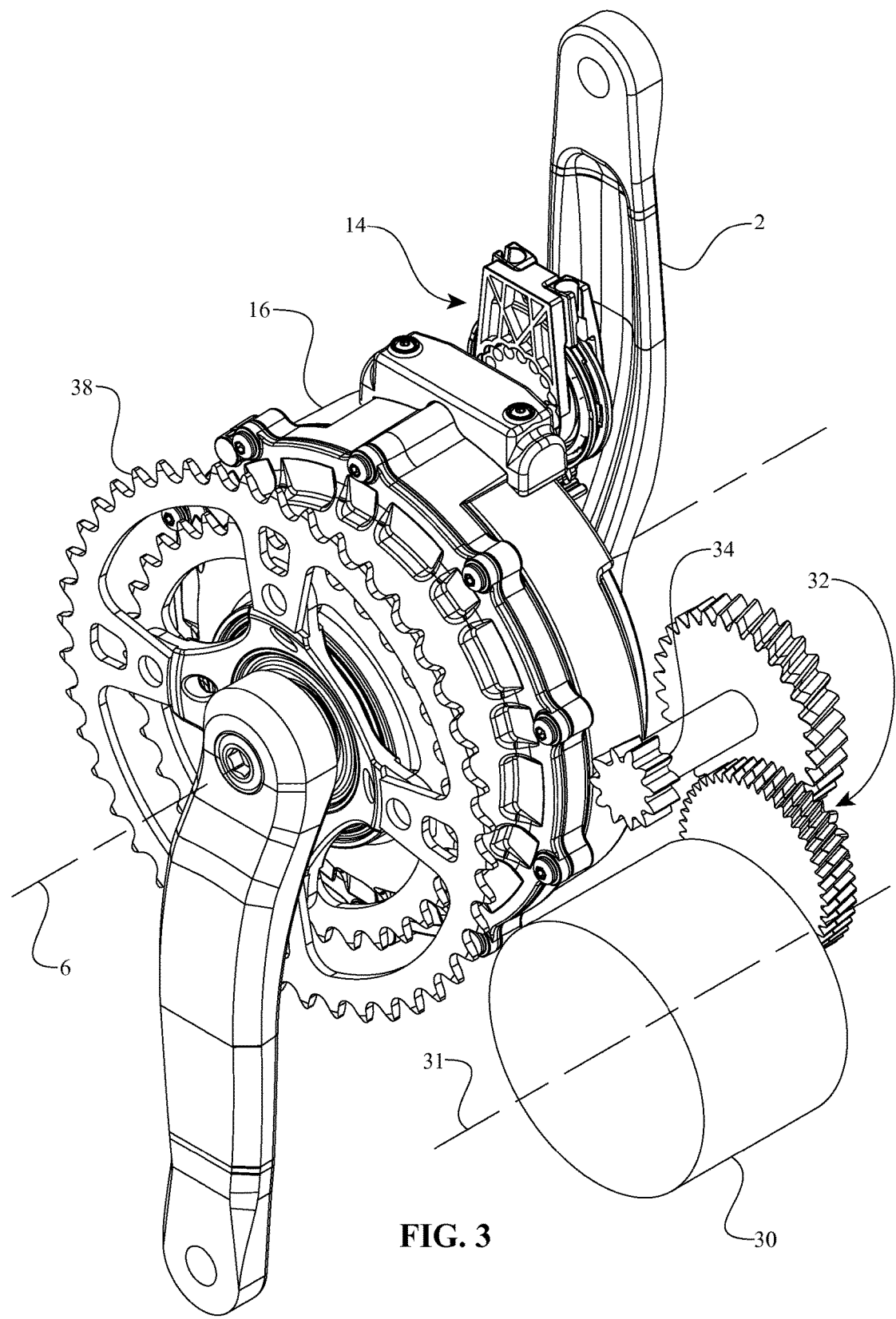
FIG. 3 is a perspective view of an electric drivetrain having the CVT of FIG. 1.

Turning now to FIGS. 2 and 3, and still referring to FIG. 1, in some embodiments, the CVT 1 can be operably coupled to an electric motor 30 via a gear set 32. The gear set 32 can be provided with a drive gear 34 in contact with a ring gear 36. In some embodiments, the ring gear 36 can be fixedly attached to the traction ring 18. In other embodiments, the ring gear 36 is coupled to the traction ring 18 through a one-way roller clutch that enables a user to pedal the bicycle with the motor off. In some embodiments, the ring gear 36 is located on the interior of the housing 16 while the drive gear 34 is located substantially on the exterior of the housing 16 and couples to the ring gear 36 through an opening in the housing 16. In some embodiments, the motor 30 has a drive axis 31 that is radially offset from, and parallel to, the crank axis 6. In other embodiments, the drive axis 31 of the motor 30 and the crank axis 6 of the crankshaft 4 are coaxial.

During operation of a bicycle equipped with the CVT 1 and the motor 30, a user applies a rotational power input to the crankshaft 4 via the cranks 2. The crankshaft 4 delivers power to the traction planet assemblies 8 via the first sun member 20. The motor 30 applies a rotational power input to the traction ring 18 through the ring gear 36 and the gear set 32. The CVT 1 combines the power from the two sources and delivers an output power to a sprocket 38 through the second sun member 22. A change in the ratio of the input to output can be achieved by varying the ratio of the CVT 1. The ratio of the CVT 1 is adjusted by a relative rotation of the first carrier member 10 with respect to the second carrier member 12. In some embodiments, the first carrier member 10 is rotatable and the second carrier member 12 is fixed to the housing 16. In some embodiments, the first carrier member 10 is rotatable in relation to the second carrier member 12, and second carrier member 12 is rotatable in relation to the fixed housing 16. A mechanism can be configured to control the relationship between the first and second carrier members 10, 12. The mechanism is rotatable in relation to the fixed housing 16, and rotatable in relation to the first carrier member 10 at a different ratio than it is rotatable in relation to the second carrier member 12.

Figure 4:
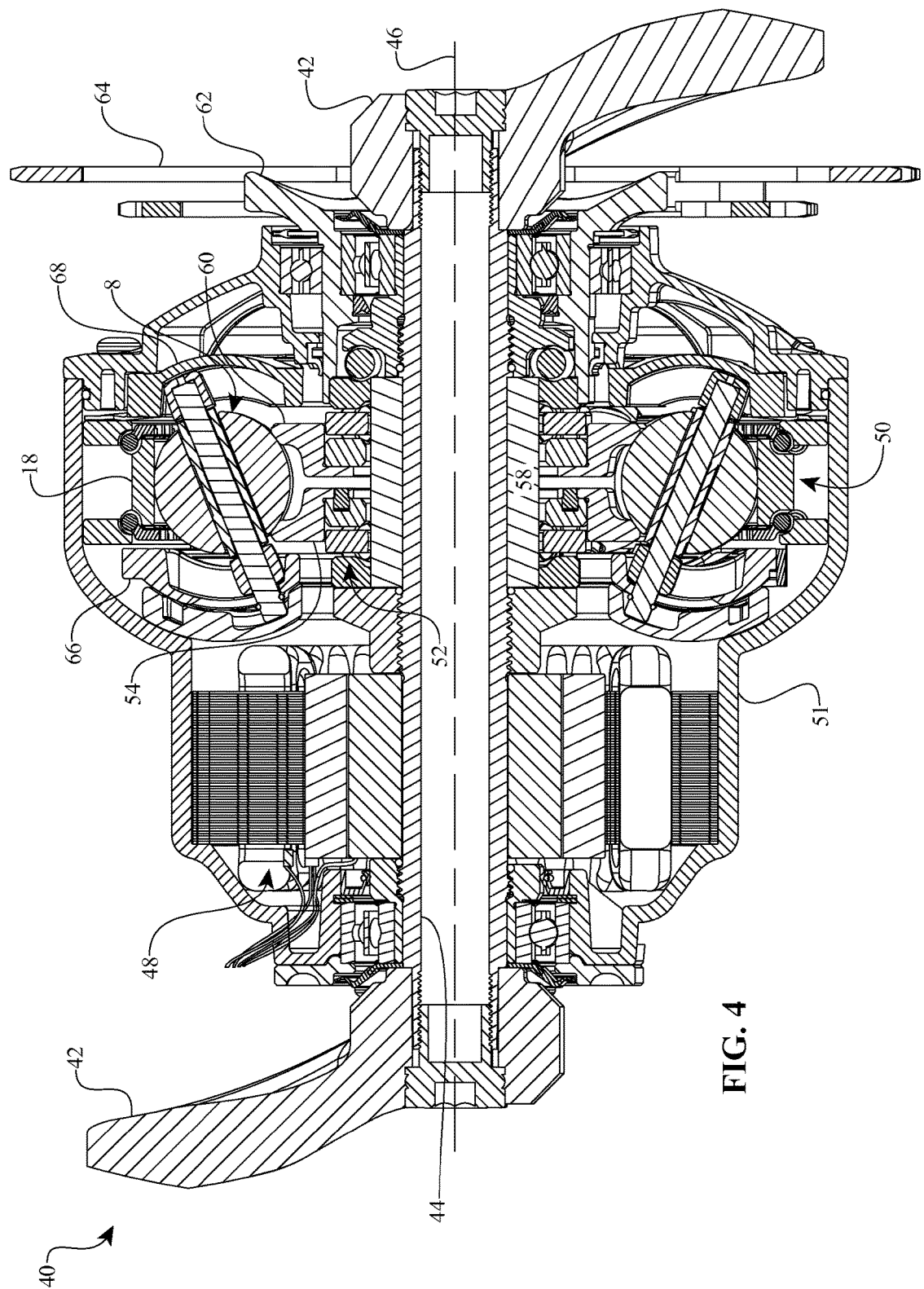
FIG. 4 is a cross-sectional view of an embodiment of an integrated electric motor and CVT.
Figure 5A:
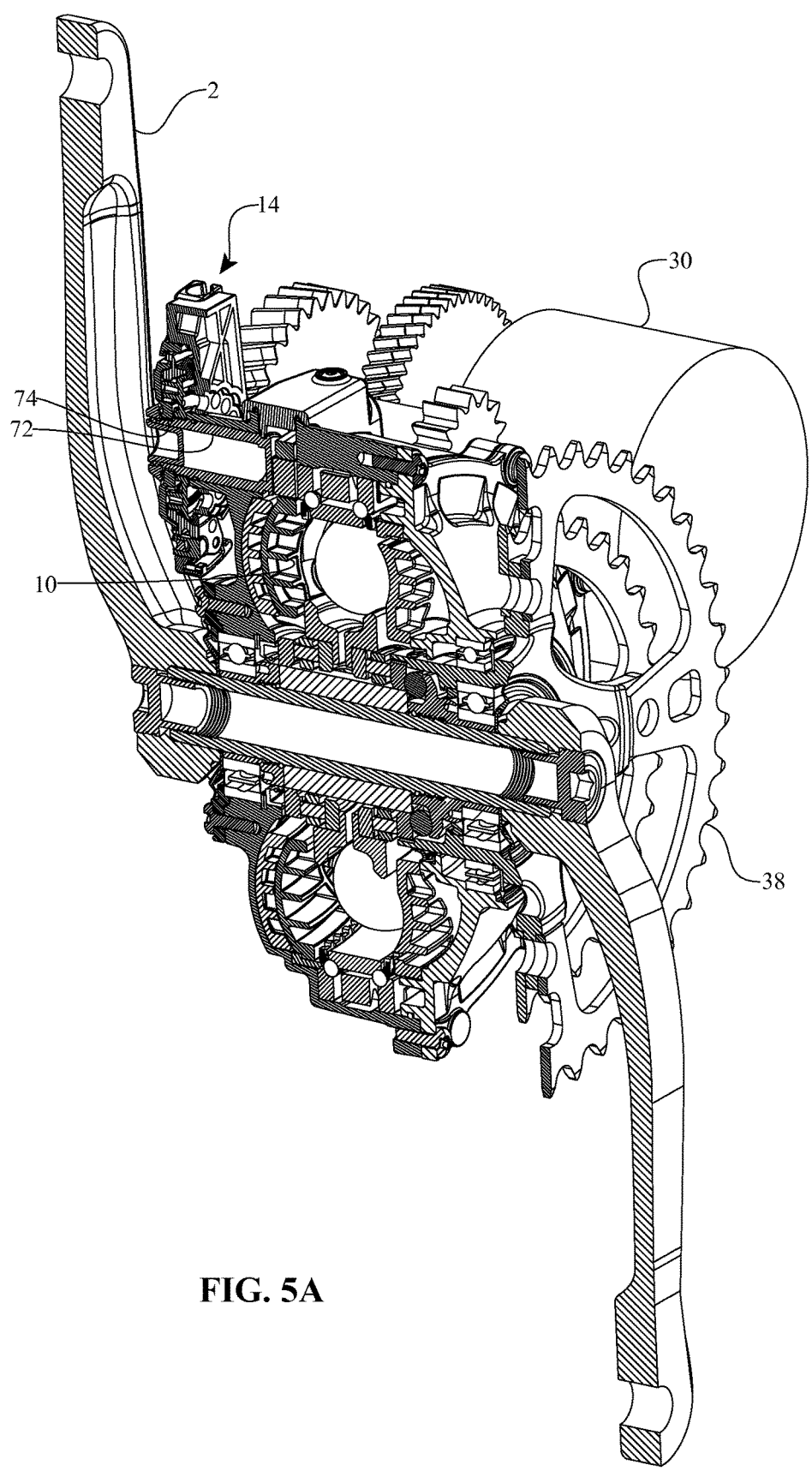
FIG. 5A is a cross-sectional perspective view of the CVT of FIG. 1.
Figure 5B:
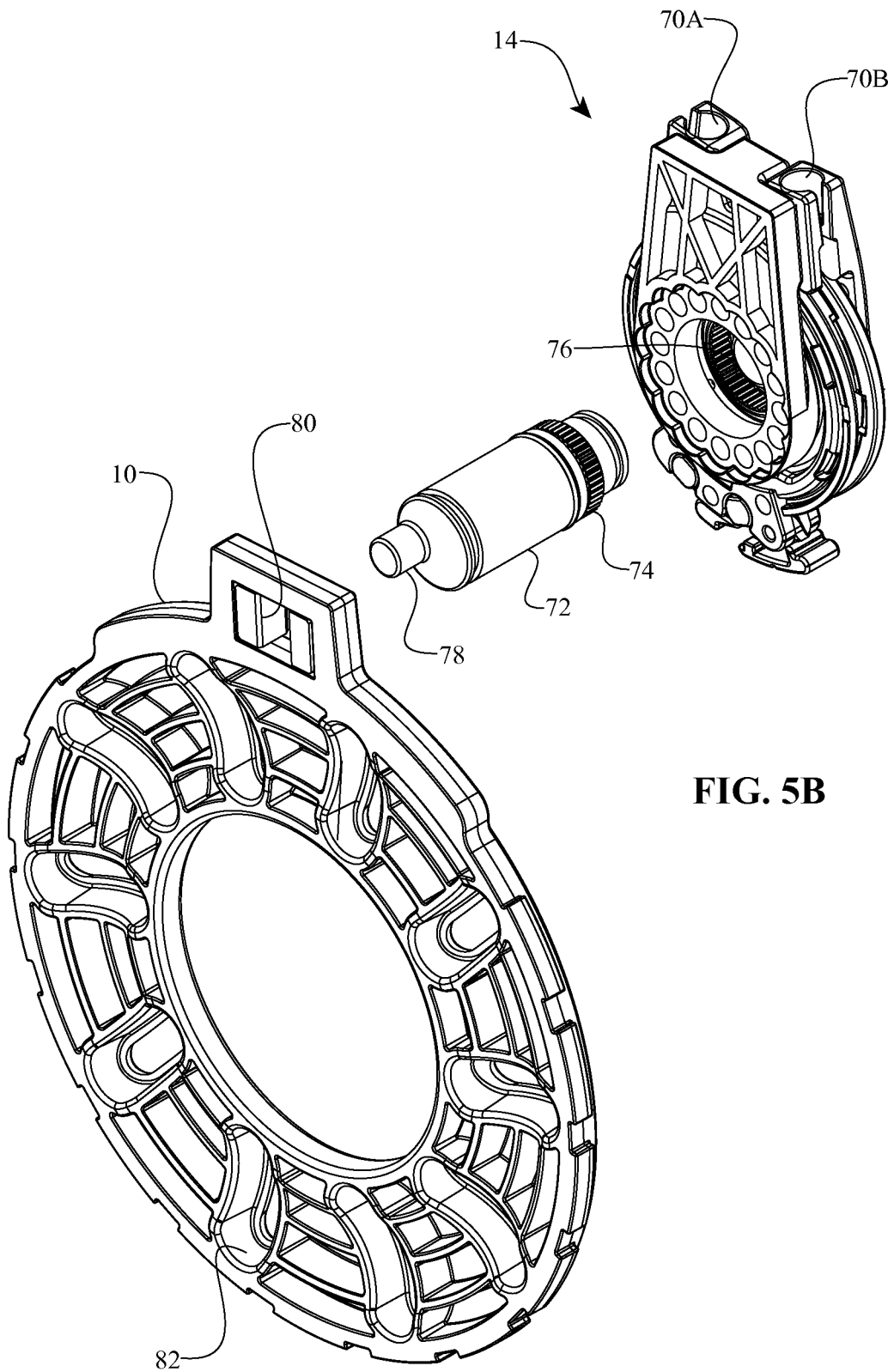
FIG. 5B is a perspective view of a carrier plate and shifter assembly that can be used with the CVTs of FIG. 1 and/or FIG. 4.

Referring now to FIGS. 4, 5A, and 5B, in some embodiments an integrated electrical drivetrain 40 can be mounted on the bottom bracket of a bicycle and operably coupled to a set of cranks 42. The cranks 42 couple to a crankshaft 44 configured to rotate about a crank axis, which in the illustrated embodiment is coaxial with a longitudinal axis 46. In some embodiments, the drivetrain 40 includes a motor 48 having a drive axis and a CVT 50 having a longitudinal axis 46. In the illustrated embodiment, the drive axis of the motor 48 is also coaxial with the longitudinal axis 46 of the CVT.

The motor 48 and the CVT 50 are substantially enclosed by a housing 51. The CVT 50 may be substantially similar to the CVT 1. For description purposes, only the differences between CVT 50 and CVT 1 will be addressed. In some embodiments, the motor 48 is operably coupled to the crankshaft 44. The crankshaft 44 is adapted to receive a rotational input power from the cranks 42 and the motor 48. In some embodiments, the motor 48 couples to the crankshaft 44 through a one-way roller clutch. The input power is transferred to the CVT 50 through a first axial force generator assembly 52 and a first sun member 54. The CVT 50 can be provided with a torque sensor 58 operably coupled to the first axial force generator assembly 52. In some embodiments, the CVT 50 has a second sun member 60 in contact with each traction planet assembly 8. The second sun member 60 is operably coupled to an output driver 62 through a second axial force generator. The output driver 62 couples to a drive sprocket 64.

During operation of the drivetrain 40, a rotational power input is transmitted to the crankshaft 44 from the cranks 42. A second source of rotational power can be transmitted to the crankshaft 44 from the motor 48. The power from each source is transmitted to the first sun member 54 through the torque sensor 58 and the first axial force generator assembly 52. The ratio of input torque and/or speed to output torque and/or speed can be adjusted by tilting the rotational axis of the traction planet assemblies 8. In some embodiments, the traction planet assemblies 8 can be tilted by relative rotation of a first carrier member 66 with respect to a second carrier member 68. Modulated power can be transmitted out of the CVT 50 through the second sun member 60. The second sun member 60 transmits power to the sprocket 64 through the output driver 62.

It should be noted that the motor 48 can be coupled to any component of the CVT 50. Likewise, the crankshaft 44 can be operably coupled to any component of the CVT 50. Combinations of input power couplings and output power couplings are discussed in U.S. Pat. No. 7,011,600, which is hereby incorporated by reference herein. In some embodiments, the integrated motor or generator electrical components described in U.S. Pat. No. 7,727,101 are incorporated.

Turning now to FIGS. 5A and 5B, in some embodiments, the shifter 14 can be similar to the shifters described in U.S. Pat. No. 8,360,917, or that of International Publication No. WO 2010/017242 A1, the entire disclosures of which are hereby incorporated by reference herein. The shifter 14 can be provided with cable channels 70 that can receive control cables from the bicycle (not shown). The shifter 14 couples to a shift drum 72 with splines 74. The splines 74 engage mating splines 76 provided on the shifter 14. In some embodiments, an end of the shift drum 74 has an eccentric, offset follower 78. The follower 78 can be received in the carrier member 10, for example, in a slot 80. During operation, the shifter 14 can be used to rotate the shift drum 72 to thereby guide the follower 78 in the slot 80 resulting in a rotation of the carrier member 10. The carrier member 10 is provided with a number of radially offset slots 82. In some embodiments, the radially offset slots 82 have a parallel but linear offset from a radial centerline of the first carrier member 10. The radial centerline of the first carrier member 10 is perpendicular to the longitudinal axis 6. A coordinate system having a z-axis corresponding to the longitudinal axis 6, a y-axis corresponding to the radial centerline, and an x-axis perpendicular to the y-axis and z-axis can be used to describe the location of the radially offset slots 82 on the first carrier member 10. The radially offset slots 82 lie in a plane formed by the x-axis and y-axis.

Each traction planet is adapted to tilt in a plane formed by the y-axis and z-axis. Additional details are provided in U.S. patent application Ser. No. 12/198,402 (corresponding to U.S. Publication No. 2010/0056322) and U.S. Pat. No. 8,167,759, the disclosures of which are incorporated by reference herein in their entirety. In some embodiments, the second carrier member 12 may include slots that are radially offset from its radii as well.

In some embodiments, the second carrier member 12, for example, can be coupled to a second shift drum (not shown) that is substantially similar to the shift drum 72. In other embodiments, a lever mechanism can be arranged to rotate either or both of the first and second carrier members 10, 12 to thereby facilitate a change in ratio of the CVT.

Figure 6:
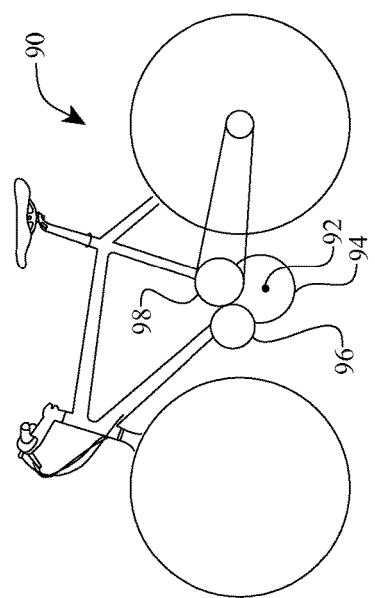
FIG. 6 is a schematic illustration of a bicycle having an electric motor and CVT coupled to a crank.

Referring now to FIG. 6, in some embodiments, a bicycle 90 can be provided with a bottom bracket crankshaft 92 and sprocket 94. The crankshaft 92 is operably coupled to an electric drivetrain having a motor 96 and a CVT 98. In some embodiments, the motor 96 has a drive axis that is radially offset from a crank axis of the crankshaft 92. The CVT 98 has a longitudinal axis that is radially offset from the crank axis of the crankshaft 92.

Figure 7:
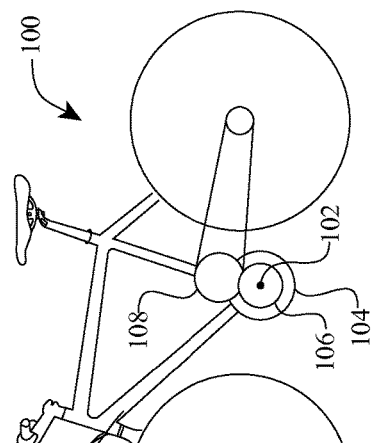
FIG. 7 is a schematic illustration of a bicycle having an electric motor coaxial with a crank of the bicycle and a CVT coupled to and offset from the crank.

Referring now to FIG. 7, in some embodiments a bicycle 100 can be provided with a bottom bracket crankshaft 102 and sprocket 104. The crankshaft 102 is operably coupled to an electric drivetrain having a motor 106 and a CVT 108. In some embodiments, a drive axis of the motor 106 and a crank axis of the crankshaft 102 are coaxial. The CVT 108 has a longitudinal axis that is radially offset from the crank axis of the crankshaft 102.

Figure 8:
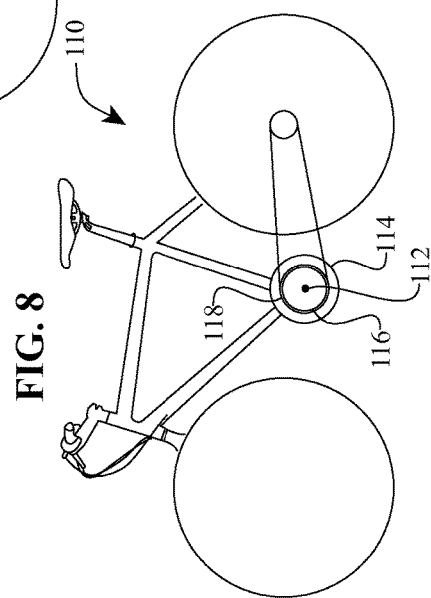
FIG. 8 is a schematic illustration of a bicycle having an electric motor coaxial with, and coupled to, a CVT, the motor and CVT coaxial with and coupled to a crank of the bicycle.

Referring now to FIG. 8, in some embodiments a bicycle 110 can be provided with a bottom bracket crankshaft 112 and sprocket 114. The crankshaft 112 is operably coupled to an electric drivetrain having a motor 116 and a CVT 118. In some embodiments, the motor 116 has a drive axis that is coaxial with a crank axis of the crankshaft 112. A longitudinal axis of the CVT 118 and a crank axis of the crankshaft 112 are coaxial.

Figure 9:
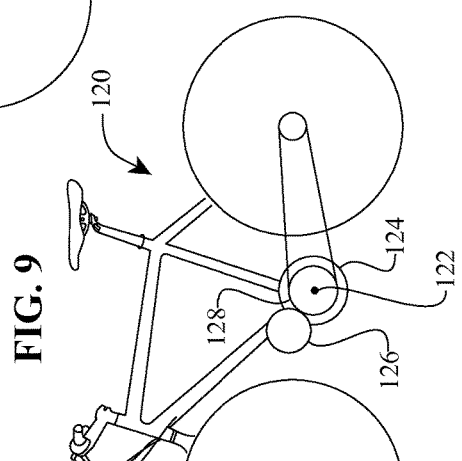
FIG. 9 is a schematic illustration of a bicycle having an electric motor coupled to, and offset from, a crank of the bicycle, and a continuously variable transmission coaxial with, and coupled to, the crank.

Referring now to FIG. 9, in some embodiments a bicycle 120 can be provided with a bottom bracket crankshaft 122 and sprocket 124. The crankshaft 122 is operably coupled to an electric drivetrain having a motor 126 and a CVT 128. In some embodiments, a drive axis of the motor 126 is radially offset from a crank axis of the crankshaft. A longitudinal axis of the CVT 128 and a crank axis of the crankshaft 122 are coaxial.

Figure 10:
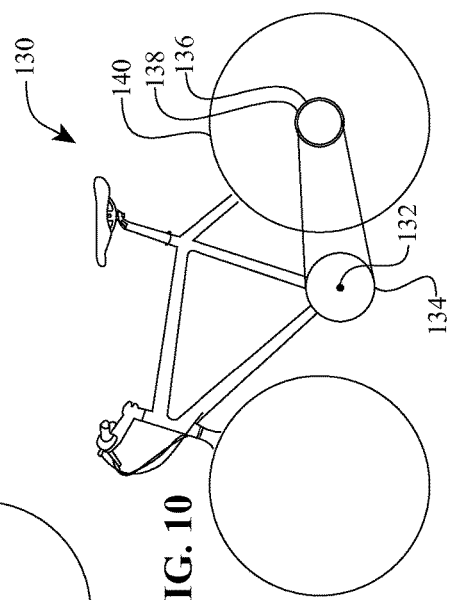
FIG. 10 is a schematic illustration of a bicycle having an electric motor coaxial with, and coupled to a CVT, the CVT coaxial with and coupled to a rear wheel of the bicycle.

Referring now to FIG. 10, in some embodiments a bicycle 130 can be provided with a bottom bracket crankshaft 132 and sprocket 134. The crankshaft 132 is operably coupled to an electric drivetrain having a motor 136 and a CVT 138 that is coupled to a rear wheel 140 of the bicycle 130.

In some embodiments, the electric motor 30 and/or 48 can be in electrical communication with a control system having an electronic controller, a number of sensors, a source of electrical power, and appropriate wiring and electrical hardware such as those described in U.S. Pat. Nos. 7,343,236 and 7,885,747 and European Patent No. 1,984,637, which are hereby incorporated by reference herein. The electronic controller can be programmed with an algorithm configured to provide automatic adjustment of the motor 30, for example. In some embodiments, the electronic controller can be programmed with an algorithm configured to provide automatic adjustment of the CVT 1, for example. As an illustrative example, the controller can receive an input associated with a target user pedaling speed and determine a speed of the bicycle. In some embodiments, a PID (proportional-integral-derivative) controller and algorithm can be employed in the control system. For example, the controller can be configured to adjust the transmission ratio based at least in part on a reading from a torque sensor. As disclosed herein, a controller may refer to a device or system for implementing preferred functionality. Embodiments of a controller or portions thereof may be integrated with other components or be separate. For example, in some embodiments, a controller may be a stand-alone device that is communicatively coupled to other components. Wired or wireless communications may be possible for communicatively coupling a controller to other components. Wireless communications may be via Bluetooth, any 802.11 compliant protocol or any other wireless protocol known to those of skill in the art. Some embodiments utilize wireless communications between a controller and the shift actuator. A portion of logic may be stored in memory associated with a CVT and a portion of logic may be implemented by a controller communicatively coupled to the CVT. For example, electronic devices such as smart phones have memory and processors available to store and execute logic, and may be mounted or otherwise associated with a CVT to allow for easy access and use by a user.

In some embodiments, the user of the bicycle can manually adjust the transmission ratio with, for example, the shifter 14. In such embodiments, the electronic controller can be programmed to control the motor 30 and provide additional power assistance to the rider based on a torque sensor reading. The torque assistance enables the rider to maintain a cadence and/or speed of the bicycle in the presence of varying terrain or other factors affecting operating condition of the bicycle. In some embodiments, the torque from the motor 30 is varied based at least in part on a command from the electronic controller.

In some embodiments, a method of automatically controlling the CVT 1 and/or the motor 30, for example, involves receiving an input associated with a target user pedaling speed, determining a speed of the bicycle, and determining a target transmission ratio based at least in part on the target user pedaling speed and the determined speed of the bicycle. A method can also include adjusting a transmission ratio of the transmission to be substantially equal to the target transmission ratio. In some embodiments, the method further includes the step of determining an encoder position associated with the target user pedaling speed. In some embodiments, the controller can adjust a transmission ratio that can include commanding an actuator to move to the determined encoder position. In some embodiments, adjusting a shift drum includes the step of rotating a shift rod about a longitudinal axis of the transmission.

A method of automatically controlling a CVT and/or a motor may include receiving an input associated with a target user pedaling speed, determining a speed of the bicycle, and based upon the target user pedaling speed and the determined speed of the bicycle, adjusting a speed ratio of the bicycle to maintain a user pedaling speed within a band of the target user pedaling speed. In some embodiments, the band is the target user pedaling speed plus or minus 10 revolutions-per-minute (rpm). In some embodiments, the band is the target user pedal speed in the range of +/−2 rpm to about +/−5 rpm. In some embodiments, adjusting a speed ratio of the bicycle includes the step of determining an encoder position associated with the target user pedaling speed and the determined speed of the bicycle. In some embodiments, adjusting a speed ratio of the bicycle includes the step of commanding an actuator to move to the determined encoder position. In some embodiments, adjusting a speed ratio of the bicycle includes the step of adjusting a shift rod of the transmission. In some embodiments, adjusting the shift rod includes the step of rotating the shift rod about a longitudinal axis of the transmission.

A method of automatically controlling a CVT and/or a motor may involve providing an input associated with a target user pedaling speed, determining a speed of the bicycle, and identifying a target encoder position associated with the speed of the bicycle. A method can further include actuating a servo to achieve the target encoder position. In some embodiments, actuating a servo includes the step of adjusting a shift rod of the transmission. In some embodiments, identifying the target encoder position includes generating a data structure. In some embodiments, generating a data structure includes the step of recording an encoder position. In some embodiments, generating a data structure includes the steps of recording an input speed and recording an output speed. In some embodiments, a method includes the step of determining a speed ratio based at least in part on the input speed and the output speed. In some embodiments, a method includes the step of recording the speed ratio.

In some embodiments, a control system for the electrical drivetrain 40, for example, can include a speed sensor configured to detect a speed of the bicycle, a processor configured to receive input from the speed sensor, and a data input interface configured to provide cadence data to the processor, the cadence data indicative of an input pedaling speed. The system may include a memory in communication with the processor, the memory having stored therein one or more maps correlating bicycle speeds with speed ratios. In some embodiments, the system includes a logic module in communication with the processor, the logic module configured to cooperate with the processor to determine from the maps a target speed ratio based on a bicycle speed and an input pedaling speed. In some embodiments, the system has an actuator in communication with the processor, the actuator configured to adjust a speed ratio of the transmission to be substantially equal to the determined target speed ratio. In some embodiments, the control unit includes at least one of a processor, an application specific integrated circuit, or a programmable logic array. The actuator is operably coupled to a shift rod of the transmission, the shift rod configured to adjust the speed ratio of the transmission. The data input interface can include a display and at least one button. The system can include a position sensor configured to provide an indication of a position of the actuator. The data structures can include a speed ratio data structure and a bicycle speed data structure. The system can have a power source configured to supply a power to the actuator. In some embodiments, the power source is a dynamo. In some embodiments, the actuator is operably coupled to a shift rod of the transmission.

In some embodiments, a control system for use with a bicycle equipped with the CVT 1 and/or the electric drivetrain 40, for example, has a speed sensor configured to detect a speed of the bicycle. The system has a processor configured to receive input from the speed sensor. In some embodiments, the system includes a data input interface configured to provide cadence data to the processor. The cadence data is indicative of an input pedaling speed. The system can include a memory in communication with the processor. In some embodiments, the memory has stored therein one or more maps correlating bicycle speeds with speed ratios. The system includes a logic module in communication with the processor. The logic module is configured to cooperate with the processor to determine from the maps a target speed ratio based on a bicycle speed and an input pedaling speed. The system can also include an actuator in communication with the processor. The actuator is configured to adjust a speed ratio of the transmission to be substantially equal to the determined target speed ratio. In some embodiments, the data input interface includes a display and at least one button. In some embodiments, the data input interface is mounted on a handlebar of the bicycle. The bicycle can include a position sensor configured to provide an indication of a position of the actuator. In some embodiments, the data structures have a speed ratio data structure and a bicycle speed data structure. In other embodiments, the ball-planetary transmission includes a shift rod, the shift rod operably coupled to the actuator.

At planet tilt angles other than zero degrees, there exists a difference in the magnitude of the opposed torques on the two carrier members, and a net torque may develop on the two carrier members. If the resulting net position of the two carrier members changes when the relative position of the two carrier members changes, then either work is being done to the two carrier members or work is being done by the two carriers. Embodiments disclosed herein may utilize the work to modify a force-position relationship of a control actuator.

Figure 11:
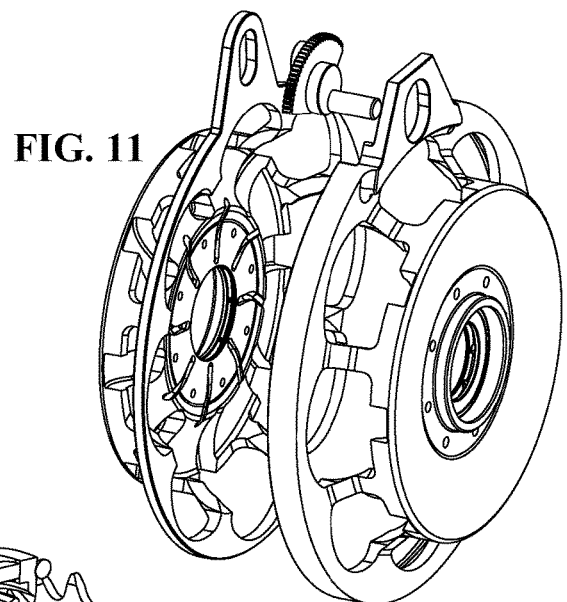
FIG. 11 is an exploded perspective view of a pair of carrier members and a shifting mechanism.

FIG. 11 is an exploded perspective view of a pair of carrier members, also referred to as stator plates (alternately referred to as carrier plates) and a shifting mechanism which can be used to advance or retard the rotation of one of the stator plates with respect to the other stator plate.

A zero plane may be defined as a plane in which lies a main axis of the CVT and at least one planet axis when that planet axis is parallel to the main axis. In the illustrated embodiment, the shifting mechanism includes two cam surfaces, one on each side of the shifting mechanism, and an outwardly extending spindle about which the shifting mechanism can be configured to rotate. Each stator plate includes an aperture configured to receive one of the cam surfaces. One of the cam surfaces may be located radially outward or inward of the other cam surface relative to the axis of rotation of the shifting mechanism. In some embodiments, an axis of eccentricity of a first cam surface may be angularly offset from an axis of eccentricity of a second cam surface. As a result of one or more of the difference in the magnitudes of eccentricity or an angular offset with respect to the axes of eccentricity, rotation of the shifting mechanism may induce a greater amount of rotation in the stator plate in contact with the radially outward cam surface than in the stator plate in contact with the radially inward cam surface. In some embodiments, one or more axes of eccentricity may be angularly offset with respect to the zero plane.

A shifting mechanism such as that depicted in FIG. 11 can sum the torque force experienced by both stator plates, thereby reducing the overall shift force required to change the position of the shifting mechanism to initiate a shift of the transmissions described herein or other similar transmissions.

In some embodiments, the cam surfaces may be spring loaded or otherwise deformable in response to increased load. For example, in one particular embodiment, at least a portion of the cam surface may be a resilient band of material which deforms in response to an applied load. By providing a dynamic cam surface whose shape is at least partially dependent upon the load, some passive feedback control of the relative rotation of the stator plates to one another may be provided, which can adjust the speed ratio in response to the load experienced by the stator plates and the cam surface. In such embodiments, the relative position of the two stator plates may be dependent on the applied load as well as the position of the shifting mechanism. While a rotating member with cam surfaces is shown to sum the forces experienced by the stator plates based upon a condition of the transmission, the summing and shifting can also be performed by levers, offset gears or other known structures, in each case that are operationally coupled to the stator plates as well.

Figure 12:
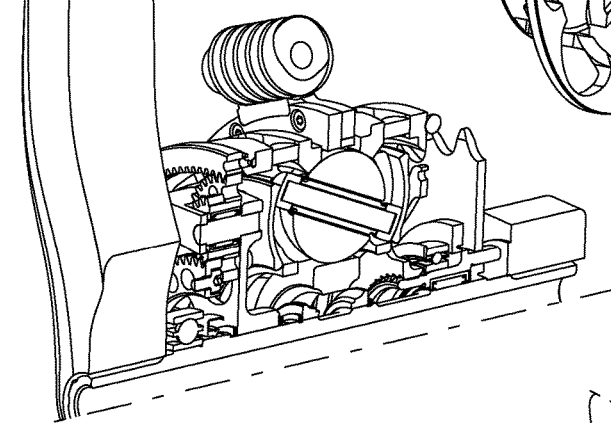
FIG. 12 is a cross-sectional perspective view of a transmission including a planetary gear set.

FIG. 12 is a cross-sectional perspective view of a transmission including a planetary gear set. A worm screw may be provided to shift the position of a shifting mechanism of the embodiments described herein and such as that shown in FIG. 11. Although the illustrated implementation depicts a worm screw which can be used to change the position of the shifting mechanism, or a stator plate, any suitable control system or apparatus may be used to control the position of the shifting mechanism or stator plates. As illustrated in FIG. 12, the planetary gear set can be used as part of the power path to change the speed and alter the torque applied to the transmission or the motor of the embodiments described herein, or it can be used to distribute torque throughout the various components in the transmission, as desired to manage the amount of torque passed through the variable path of the transmission. In some embodiments, multiple paths for power to pass are present and it may be advantageous to vary the amount of power that is transferred through the planets of the transmission to improve efficiency, to manage torque and the associated stress or for other commonly known reasons. For example, the planetary gear set can be used to step up the speed of an input component and reduce the torque going to the generator.

In addition, a motor may also be integrated with the planetary gear set. As described in greater detail in U.S. Pat. No. 7,632,203, the disclosure of which is incorporated by reference herein in its entirety, the integration of a motor and a transmission can also advantageously be used to alter the operating conditions of the motor and enhance the performance of the motor. For example, stepping up the speed of certain motor components relative to other components can increase the resultant flux characteristics and enhance motor performance. Additional examples of motor types, motor configurations, and the beneficial effects which can be achieved by integrating a motor with a transmission including a planetary gear set are described in U.S. Pat. No. 7,632,203.

Figure 14:
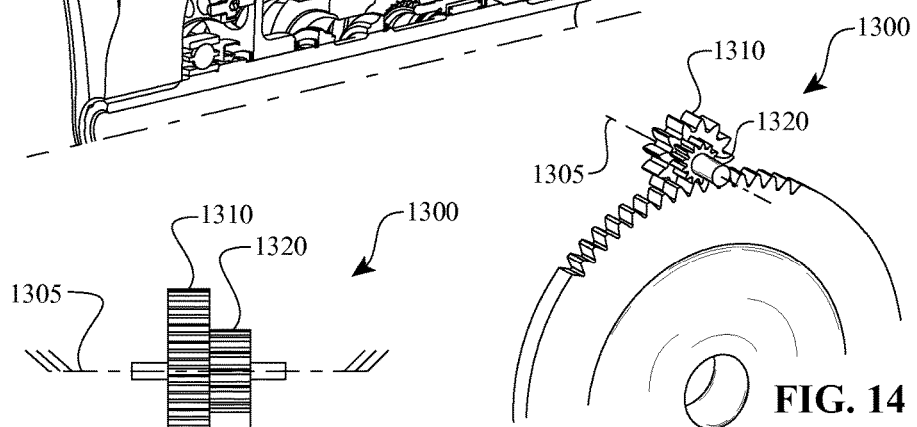
FIG. 14 shows a perspective view of a multi-diameter gear structure.
Figure 13:
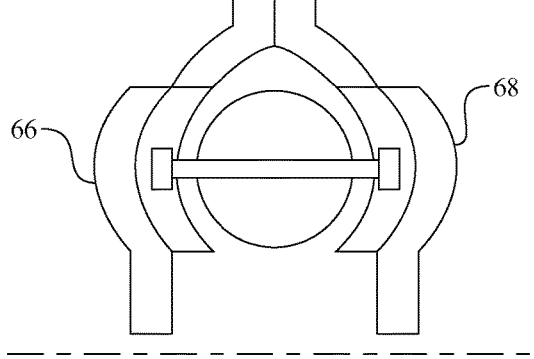
FIG. 13 schematically depicts a portion of a transmission including two stator plates and a rotatable gear structure in contact with each of the carrier members.
Figure 15:
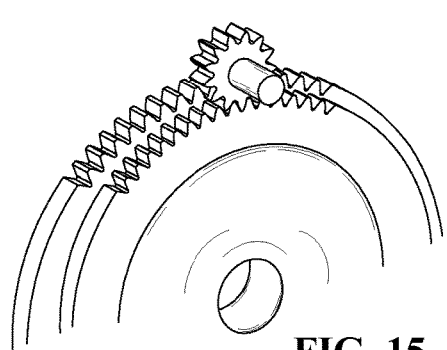
FIG. 15 shows an opposite perspective view of the multi-diameter gear structure of FIG. 14.

FIGS. 13-15 show a method of controlling the relative rotation of two carrier members, such as carrier members 66, 68 depicted in FIG. 4. FIG. 13 schematically depicts a portion of a transmission including carrier members 66, 68 and a rotatable gear structure 1300 in contact with each of the stator plates and rotatable about axis 1305. Gear structure 1300 includes a first section 1310 having a first diameter and in contact with first carrier member 66, and a second section 1320 having a second diameter and in contact with second carrier member 68. Because of the differences in diameter of the two gear sections, the gear structure can control the relative rates of rotation of first and second carrier members 66, 68, while still summing the reaction forces of the two carrier members to reduce overall shift force required to adjust the tilt angle of the ball axles of the transmissions described herein.

FIG. 14 shows a perspective view of a multi-diameter gear structure, such as the one described above with respect to FIG. 13, shown here in contact with a toothed section of a single plate. In particular, a first portion of the multi-diameter gear structure, having a larger diameter than the remainder of the structure, is in contact with a toothed section of a first plate. A second portion of the multi-diameter gear structure, with a smaller diameter, can be in contact with a toothed section of a second plate (see FIG. 15), not shown in FIG. 14 for the sake of clarity.

FIG. 15 shows an opposite perspective view of the multi-diameter gear structure of FIG. 14, shown here in contact with two plates. The narrower portion of the multi-diameter gear structure (not visible in FIG. 14) is in contact with a toothed portion of the rear plate, while the thicker portion of the multi-diameter gear structure is in contact with a toothed portion of the front plate. As described above with respect to FIG. 13, the differences in diameter between the geared sections of the multi-diameter gear structure control the relative amount of rotation between the two plates.

Those of skill will recognize that the various illustrative logical blocks, modules, circuits, and algorithm steps described in connection with the embodiments disclosed herein, including with reference to the transmission control systems described herein, for example, may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such that the processor can read information from, and write information to, the storage medium. In the alternative, the storage medium may be integral to the processor. The processor and the storage medium may reside in an ASIC. For example, in some embodiments, a controller for the CVT 1 comprises a processor (not shown).

The foregoing description details certain embodiments of the disclosure. It will be appreciated, however, that no matter how detailed the foregoing appears in text, the disclosure can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the disclosure with which that terminology is associated.

One or more embodiments described above can be claimed as follows, but this list is not exhaustive and the description contains other embodiments.

What is claimed is:

1. A bicycle having a plurality of frame members and a crankshaft defining a crank axis, the bicycle comprising:
   a continuously variable transmission (CVT) coupled to the crankshaft, wherein the CVT comprises
      a plurality of traction planets arranged angularly about a longitudinal axis of the CVT, each traction planet rotatable about an axle defining a tiltable axis,
      a first carrier member having a plurality of radially offset slots formed therein and arranged angularly about the longitudinal axis,
      a second carrier member having a plurality of radial slots formed therein and arranged angularly about the longitudinal axis, wherein the first carrier member is rotatable relative to the second carrier member about the longitudinal axis,
      a traction ring in contact with each traction planet, and
      first and second sun members in contact with each traction planet, the first and second sun members radially inward of the plurality of traction planets; and
   an electric motor operably coupled to the CVT, the electric motor having a drive axis.

2. The bicycle of claim 1, wherein the drive axis of the electric motor and one or more of the longitudinal axis of the CVT and the crank axis are coaxial.

3. The bicycle of claim 2, wherein the electric motor and CVT are located in a rear wheel of the bicycle.

4. The bicycle of claim 1, wherein the longitudinal axis of the CVT is offset from the crank axis.

5. The bicycle of claim 1, wherein the longitudinal axis of the CVT is offset from the drive axis of the electric motor, and wherein the electric motor is coupled to the CVT via a gear set.

6. The bicycle of claim 1, wherein a housing of the CVT is non-rotatable with respect to the bicycle frame members.

7. The bicycle of claim 6, wherein the housing forms a portion of a bottom bracket of the bicycle.

8. A continuously variable transmission in a housing coupled to a bottom bracket of a bicycle, the transmission comprising:
   a plurality of traction planets arranged angularly about a longitudinal axis;
   a traction ring in contact with each traction planet, the traction ring located radially outward of each traction planet;
   first and second sun members in contact with each traction planet, the first and second sun members located radially inward of and in contact with the plurality of traction planets, wherein the first sun member and the traction ring are adapted to receive a rotational power;
   a carrier assembly comprising
      a first disc-shaped body having a first center,
      a second disc-shaped body having a second center arranged coaxially with respect to the first center thereby forming a main axis, and
      a plurality of radially offset slots formed on and arranged angularly about the center of the first disc-shaped body, each of the radially offset slots having a linear offset from a centerline of the first disc shaped body, wherein the centerline of the first disc shaped body is perpendicular to the main axis defined by a coordinate system, the coordinate system having a z-axis corresponding to the main axis, a y-axis corresponding to the radial centerline, and a x-axis perpendicular to the y-axis and z-axis, and wherein the radially offset slots lie in a plane formed by the x-axis and y-axis; and
   an electric motor coupled to the traction ring, the electric motor being offset from the longitudinal axis, the electric motor located within the interior of the housing.

9. A continuously variable transmission comprising:
   a plurality of traction planets arranged angularly about a longitudinal axis;
   a traction ring in contact with each traction planet;
   a sun member in contact with each traction planet, the sun member located radially inward of and in contact with the plurality of traction planets, wherein the sun member and the traction ring are adapted to receive a rotational power;
   a carrier assembly comprising
      a first carrier member having a first center,
      a second carrier member having a second center arranged coaxially with respect to the first center thereby forming a main axis, and
      a plurality of radially offset slots formed on and arranged angularly about the center of the first carrier member, each of the radially offset slots having a linear offset from a centerline of the first carrier member; and
   a control mechanism configured to rotate the net position of the two carrier members during a control movement, wherein the centerline of the first carrier member is perpendicular to the main axis thereby forming a coordinate system, the coordinate system having a first axis corresponding to the main axis, a second axis corresponding to the centerline, and a third axis perpendicular to the first axis and the second axis, and wherein the radially offset slots lie in a plane formed by the second axis and the third axis.

10. The bicycle of claim 1, further comprising an electronic controller communicatively coupled to the motor.

11. The bicycle of claim 10, further comprising a control system coupled to the CVT and the electronic controller, wherein the electronic controller is configured to control the CVT and the motor.

12. The bicycle of claim 11, wherein the electronic controller is configured to maintain a speed of the bicycle.

13. The bicycle of claim 11, wherein the electronic controller is configured to maintain a cadence.

* * * * *